US006727840B1

(12) United States Patent
Sullivan

(10) Patent No.: US 6,727,840 B1
(45) Date of Patent: Apr. 27, 2004

(54) INTERFERENCE SUPPRESSION CIRCUIT AND METHOD THEREOF FOR MULTI-CHANNEL RECEIVERS

(76) Inventor: William B. Sullivan, P.O. Box 289, Rockaway, NJ (US) 07866-0289

( * ) Notice: Subject to any disclaimer, the term of this patent is extended or adjusted under 35 U.S.C. 154(b) by 0 days.

(21) Appl. No.: 10/355,689

(22) Filed: Feb. 3, 2003

(51) Int. Cl.[7] ............................. G01S 7/02; G01S 7/36
(52) U.S. Cl. ..................... 342/13; 342/195; 342/444
(58) Field of Search ........................ 342/13, 14, 159, 342/195, 442, 417, 445, 420, 444; 367/901

(56) References Cited

U.S. PATENT DOCUMENTS 5,737,715 A * 4/1998 Deaton et al. ............. 455/12.1
6,313,781 B1 * 11/2001 Lee ............................. 342/13
6,388,604 B1 * 5/2002 Lee ............................. 342/13

* cited by examiner

Primary Examiner—Ian J. Lobo
(74) Attorney, Agent, or Firm—Zachary T. Wobensmith, III

(57) ABSTRACT

The Electronic Support Measure (ESM) system is disclosed having various embodiments all of which reduce or even eliminate the detrimental effects caused by interference signals commonly generated by CW emitters.

20 Claims, 10 Drawing Sheets

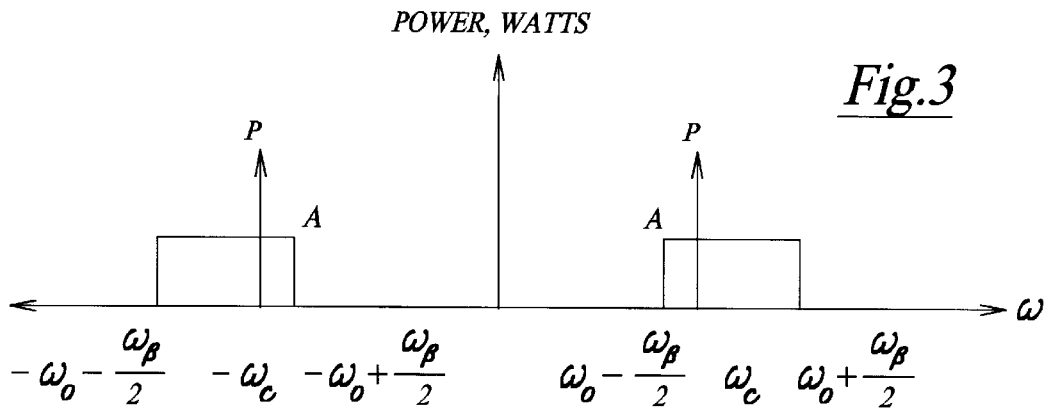
Fig.3
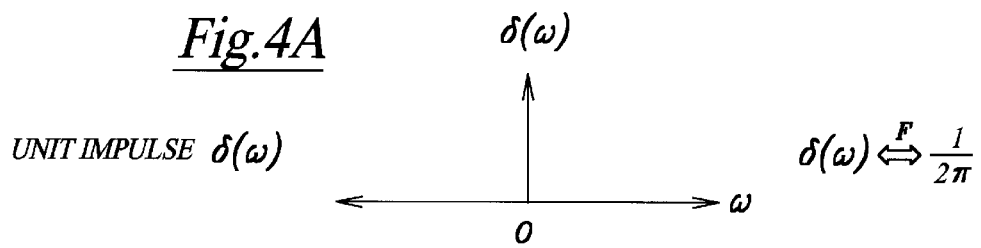
Fig.4A UNIT IMPULSE $\delta(\omega)$     $\delta(\omega) \xleftrightarrow{F} \dfrac{1}{2\pi}$
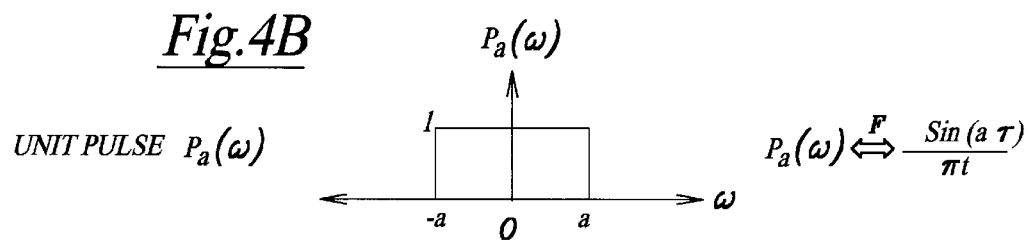
Fig.4B UNIT PULSE $P_a(\omega)$     $P_a(\omega) \xleftrightarrow{F} \dfrac{\sin(a\tau)}{\pi t}$
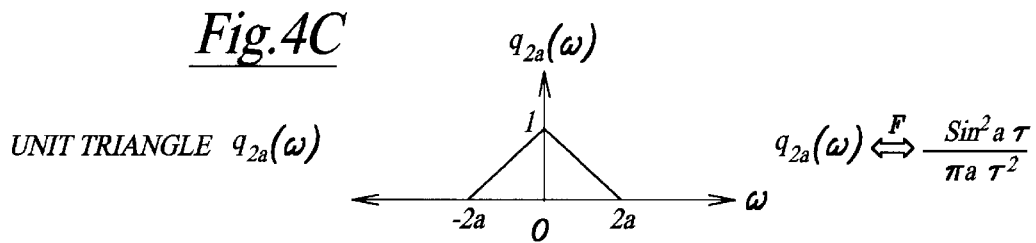
Fig.4C UNIT TRIANGLE $q_{2a}(\omega)$     $q_{2a}(\omega) \xleftrightarrow{F} \dfrac{\sin^2 a\tau}{\pi a \tau^2}$

US 6,727,840 B1

INTERFERENCE SUPPRESSION CIRCUIT AND METHOD THEREOF FOR MULTI-CHANNEL RECEIVERS

BACKGROUND OF THE INVENTION

1.0 Field of the Invention

The present invention relates to an Electronic Support Measure (ESM) system and, more particularly, to a circuit for removing interference signals from the frequency spectrum of the RF signals incoming to and being analyzed by the ESM system.

2.0 Description Related to the Prior Art

Electronic Support Measure (ESM) system, such as a prior art ESM system 10 shown in FIG. 1 herein, often employ a single, Wide Bandwidth Receiver 12, for measuring RF frequency parameters on RF signals received via an Omnidirectional antenna 14. This single serial arrangement is in parallel with a multi-channel receiver, such as Crystal Video Receiver (CVR) 16, operatively cooperating with a Constant Beamwidth Lens (CBL) antenna 18, providing, in a manner to be described, quantities 20 comprising RF amplitude, pulse width, Time Of Arrival (TOA), and Direction Finding (D/F) data associated with the incoming RF signal.

In operation, an incoming RF signal entering the Omnidirectional antenna 14 is detected and the RF signal frequency parameters thereof are estimated and sent, by way of the Wide Band Receiver 12, to the System Digital Processor 22. Simultaneously, an adjacent Constant Beamwidth Lens (CBL) Antenna 18 receives the same RF input. The CBL antenna 18, as well as the Crystal Video Receiver (CVR) 16, is comprised of multiple receiving elements. The multiple elements, as well as RF signal portions, are identified herein by the use of subscripts. When appropriate, a grouping of elements is simply referred to by its generic reference number. Each portion $18_1$, $18_2$ . . . $18_M$ of the RF signal received by CBL antenna 18 is delivered to a single Constant Bandwidth Lens (CBL) 24 which focuses the received RF signal, dependent on the azimuth of the RF source relative to the receiving elements, to multiple parallel lens RF outputs $26_1$, $26_2$ . . . $26_N$. Each lens RF output $26_1$, $26_2$ . . . $26_N$ serving as channels is provided for by the Crystal Video Receiver (CVR) 16, consisting of an RF band filters $28_1$, $28_2$ . . . $28_N$, protective RF Limiters $30_1$, $30_2$ . . . $30_N$, and Detector Log Video Amplifiers (DLVA) $32_1$, $32_2$ . . . $32_N$. Following RF filtering appropriate to the RF band of interest, the DLVA 32 logarithmically detects the input RF signal amplitude and each CVR channel respectively produces an analog video voltage output $34_1$, $34_2$ . . . $34_N$ proportional to the logarithm of the RF input signal envelope power to be further described hereinafter with reference to FIGS. 3 and 4. To permit processing of a wide range of RF input duty cycles, (including CW) outputs of the CVR elements $32_1$, $32_2$ . . . $32_N$ are DC coupled.

The multiple parallel video outputs from the CVR elements $32_1$, $32_2$ . . . $32_N$ on signal paths $34_1$, $34_2$ . . . $34_N$ are provided to a Digitizer/Angle Encoder 36, where each RF amplitude video input is digitized. Multiple adjacent digitized video inputs on signal paths $34_1$, $34_2$ . . . $34_N$ are compared with each other to determine the relative azimuth of the RF signal source, using a relative amplitude comparison process. The highest level RF video input on signal paths $34_1$, $34_2$ . . . $34_N$ is processed to estimate the RF input signal power level, the RF input signal pulse width, and the TOA. This parametric data derived by the Digitizer/Angle Encoder 36, are sent to the System Digital Processor 22 where these data are combined with the RF frequency data received from wide band receiver 12 and then analyzed by the System Digital Processor 22 to determine the type of RF signal source and relative azimuth of the signal source generating the incoming RF signal.

The ESM System 10 of FIG. 1, particularly suited for shipboard use, is a typical design. In practice, the Omnidirectional antenna 14 and the Wide Band Receiver 12 usually provides hemispherical coverage, with two systems employed, each covering one side of a ship. Similarly, the CBL Antenna 18 usually provides instantaneous coverage of a single quadrant, with two CBL Antennas 18 and two Crystal Video Receiver 16 per one Omnidirectional antenna 14 and Wide Band Receiver 12.

The number of CVR 16 channels per CBL Antenna 18 depends on the RF frequency band coverage associated with the incoming RF signals and the desired azimuth measurement resolution; typically, this varies from ten to twenty CVR element grouping per CBL Antenna 18. For example, a CVR 16 having twenty (20) channels requires band filters $28_1$, $28_2$ . . . $28_{20}$. The instantaneous RF frequency coverage of a system is usually restricted to a 3:1 bandwidth, for example, 2–6 GHz or 6–18 GHz. A full shipset, covering 2–18 GHz, might then require four Omnidirectional antennas 14 and Wide Band Receivers 12 (one per ship side per band); and each Omnidirectional antenna 14 and Wide Band Receiver 12 would require two Crystal Video Receivers 16 (one per quadrant). Each Crystal Video Receiver 16 would require (typically) fifteen groups of elements 28, 30, and 32. The total elements 28, 30 and 32, per ship, is approximately one hundred and twenty units.

The ESM System 10 has generally proven to be accurate and cost effective. There is, however, a problem with local interference, particularly with own-ship CW emitters (such as CW target illuminators and SATCOM related signals). More particularly, an own-ship CW signal existing in the ESM System 10 operating band and received above the ESM System 10 operating threshold, set for its receiving elements, will be detected and processed by both the single serial arrangement of the Omnidirectional antenna 14 and Wide Band Receiver 12 and the parallel operating CBL antenna 18 and the CVR 16. Any other received RF signal that is of lesser RF power at these antennas 14 or 18 will be obscured by this own-ship signal; if the other signal is associated with a threat, a serious condition occurs, that is, where an own-ship signal has blinded the ESM System 10 to the existence of the threat.

Normally, own-ship interfering signals, such as those generated by CW emitters, are eliminated with the use of fixed or tunable RF notch filters. This approach is useful and effective for the single serial arrangement of the Omnidirectional antenna 14 and Wide Band Receiver 12, but is not useful for the parallel operating CBL antenna 18 and CVR 16. More particularly, consider that a typical installation employs only four serial arrangements of the Omnidirectional antenna 14 and Wide Band Receiver 12, but requires one hundred twenty grouping of CVR 16 elements 28, 30, and 32 to support the parallel operation of the CBL antenna 18 and CVR 16. Further, if multiple signals are present and one signal frequency is suppressed in the single serial arrangement of the Omnidirectional antenna 14 and Wide Band Receiver 12, but not in the parallel operating CBL antenna 18 and CVR 16, the system is likely to produce RF frequency data from one emitter and RF amplitude, TOA, pulse width, and AOA data from a different emitter. Solutions to this problem have, to date, focused on trapping out the interference in the single serial arrangement of the Omnidirectional antenna 14 and Wide Band Receiver 12, reducing the sensitivity of both the Wide Band Receiver 12 and the CVR 16, and shielding the CBL Antennas 18 from the interference. None of these solutions or combinations therefore has proved satisfactory. It is desired to provide an ESM System that reduces or even eliminates the operational detrimental local interference effects created by own-ship emitters, while minimizing the additional circuitry needed to accomplish the elimination.

OBJECTS OF THE INVENTION

It is an object of the present invention to provide an ESM system successfully operated on a ship and that reduces or even eliminates the operational detrimental local interference effects created by own-ships emitters, while minimizing the additional logic thereto needed to accomplish the elimination.

It is a further object of the present invention to provide a circuit for reducing the interference suppression and arranging the circuit in the single serial arrangement of the Omnidirectional antenna of the ESM system and minimizing the logic added to the parallel operating the CBL antenna and CVR.

It is a further object of the present invention to selectively desensitize the operation of the parallel operating CBL antenna and CVR arrangement by selectively suppressing one or more RF input frequencies handled by the single arrangement of the Omnidirectional antenna and associated Wide Band Receiver.

Another object of the present invention to cause the operation of the single serial arrangement of the Omnidirectional antenna and Wide Band Receiver to translate the received RF spectrum of the incoming RF signals by a fixed offset frequency and then using that offset frequency, to desensitize the operation of a parallel arrangement of a CBL antenna and CVR.

It is an additional object of the present invention to selectively desensitize the operation of the parallel channels of the CBL antenna and CVR.

It is still a further object of the present invention to synchronize the single serial arrangement of the Omnidirectional antenna and Wide Band Receiver with the operation of the parallel functioning CBL antenna and CVR.

Moreover, it is an object of the present invention to provide an ESM system that eliminates or substantially reduces the analog operating components thereof and replaces those components with a digital operating processor to provide for the handling of digital data.

SUMMARY OF THE INVENTION

The invention is directed to an interference suppression circuit and method of operation thereof for multi-channel receivers and is particularly suited for an ESM system.

The Electronic Support Measure (ESM) system has a Constant Beamwidth Lens (CBL) antenna that receives incoming RF signals and provides a plurality of output signals. The ESM system comprises a) a log video amplifier receiver having multiple channels with each channel receiving a respective one of the plurality of output signals of the CBL antenna. The log video amplifier receiver comprises a first mixer having first and second inputs and an output, and with the first input receiving a signal representatively of the respectively output signal of the CBL antenna. The output of the first mixer is connected to a logarithmic amplifier, which provides an output video signal comprising the output signal of the respective channel of the log video amplifier receiver. The ESM system further comprises b) an Omnidirectional antenna receiving the incoming RF signals and providing a respective output thereof; c) a notch filter receiving the output signal of the Omnidirectional antenna and providing a filtered output thereof; d) a Wide Band Receiver receiving the output of the notch filter and providing first and second outputs each representative of the output of the notch filter; e) an oscillator having a predetermined frequency and providing an output signal; and f) a second mixer having first and second inputs and an output, and with the first input receiving the first output of the Wide Band Receiver and the second input receiving the output of the oscillator. The output of the second mixer is connected to the second input of each of the first mixers. The ESM system further comprises g) a digitizer/angle encoder connected to receive each of the output signals of each of the channels of the log video amplifier receiver. The digitizer/angle encoder provides output quantities representative of the amplitude, pulse width and time of arrival (TOA) of the RF signal and direction finding (D/F) data thereof. The ESM system further comprises h) a system digital processor connected to receive the output quantities of said digitizer/angle encoder and said second output of said Wide Band Receiver.

DETAILED DESCRIPTION OF THE DRAWINGS

A better understanding of the present invention may be realized by considering the following details and description, taken in conjunction with the accompanying drawings wherein:

FIG. 3 is an illustration of the RF input power spectral density of incoming RF signals related to the present invention;

Figure 5:
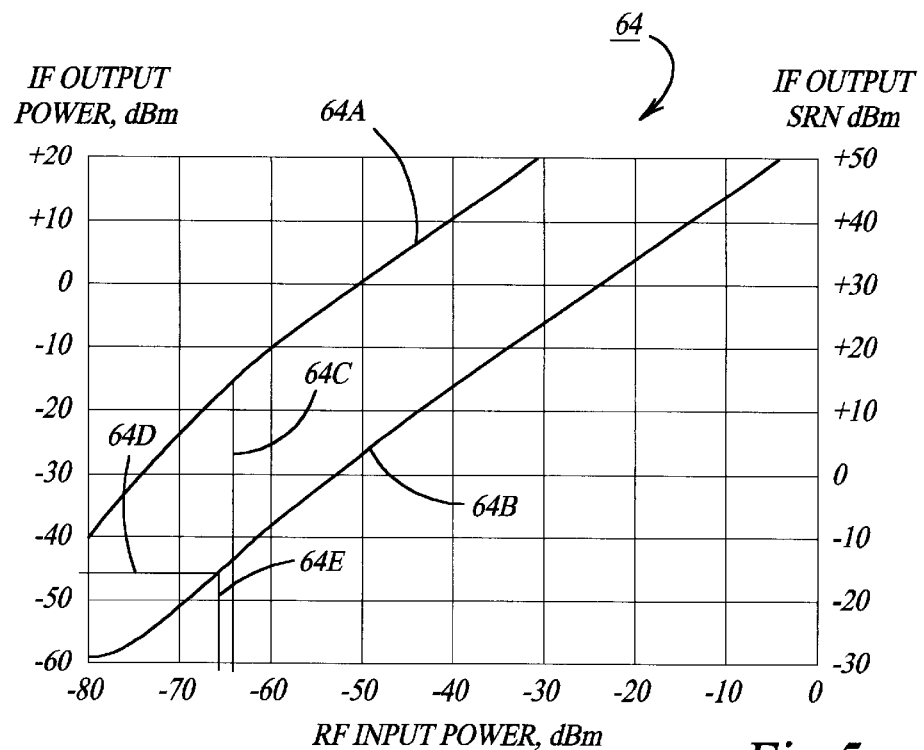
Figure 6:
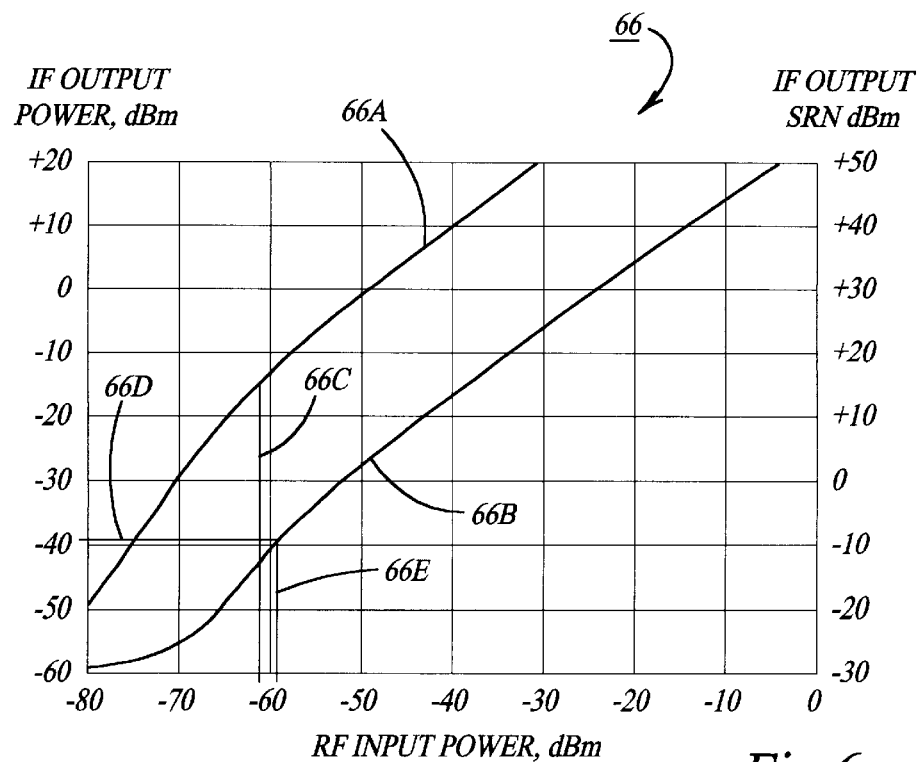
Figure 7:
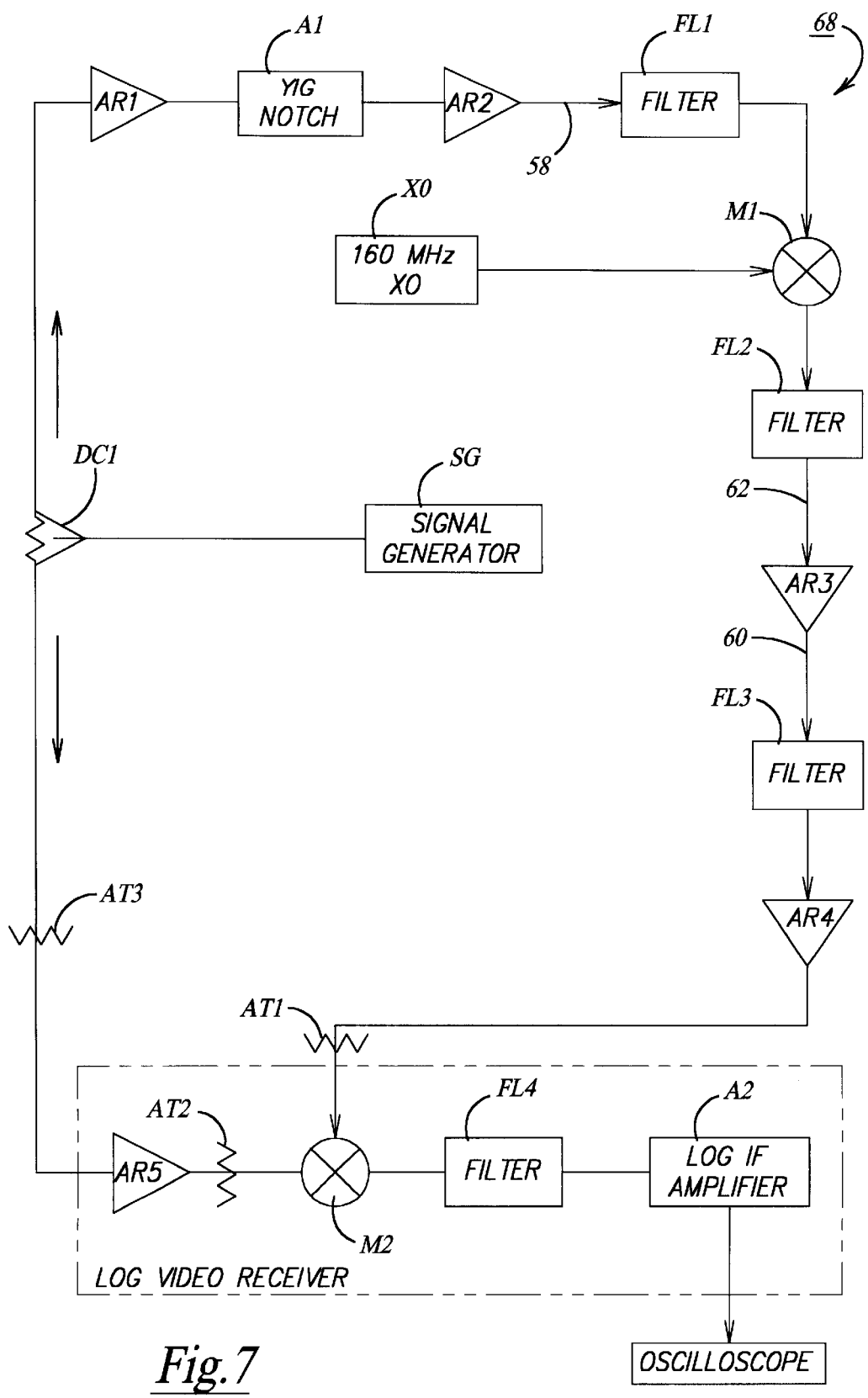
Figure 8:
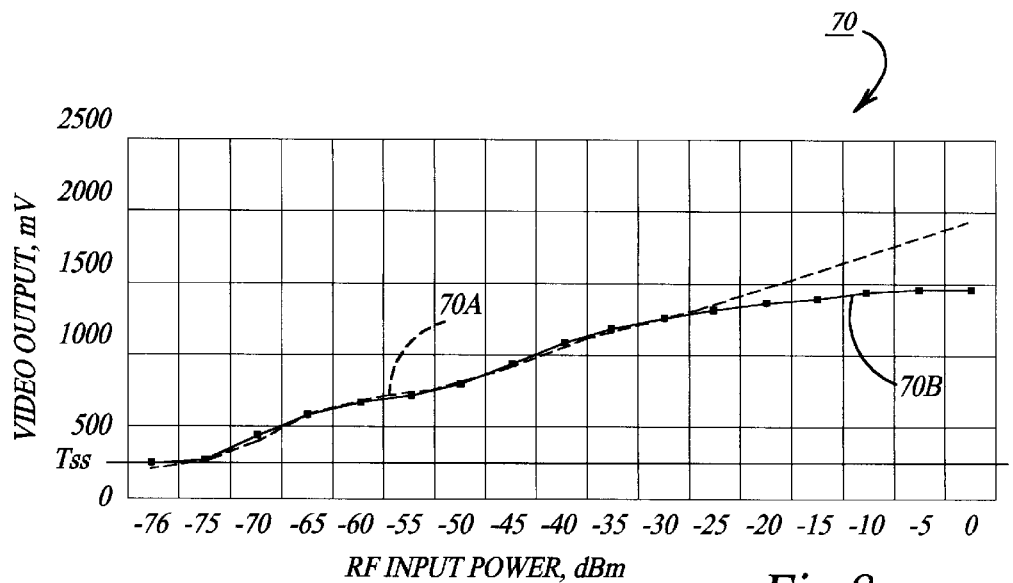
Figure 9:
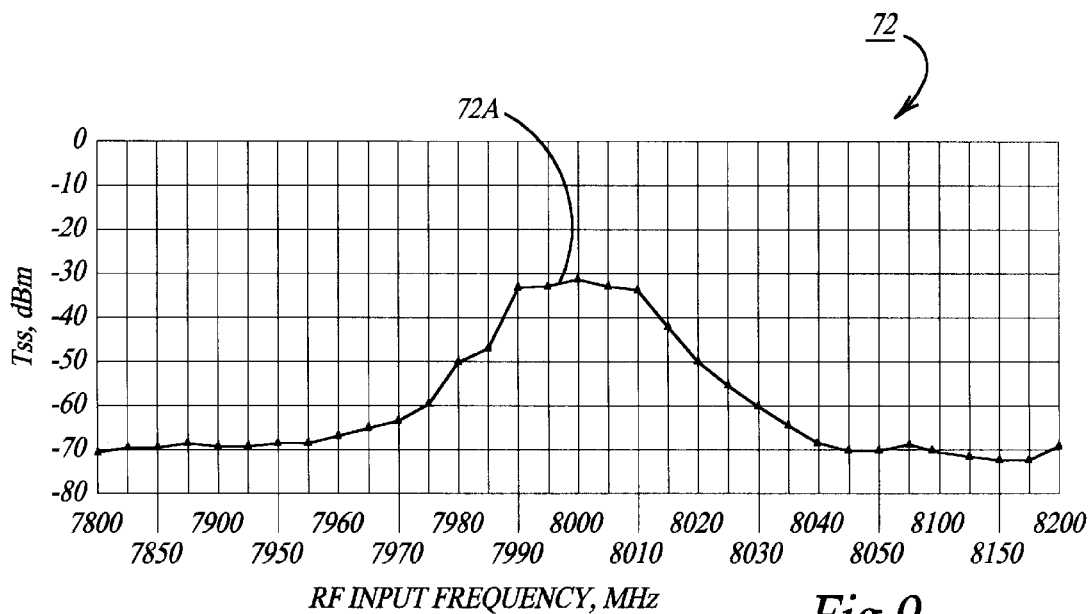
Figure 10:
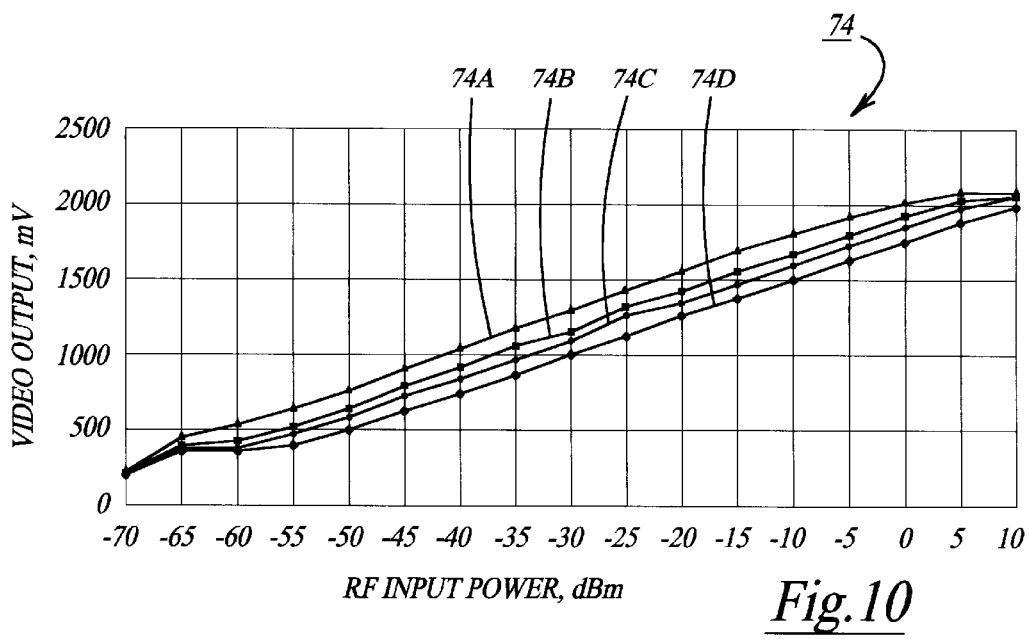
Figure 11:
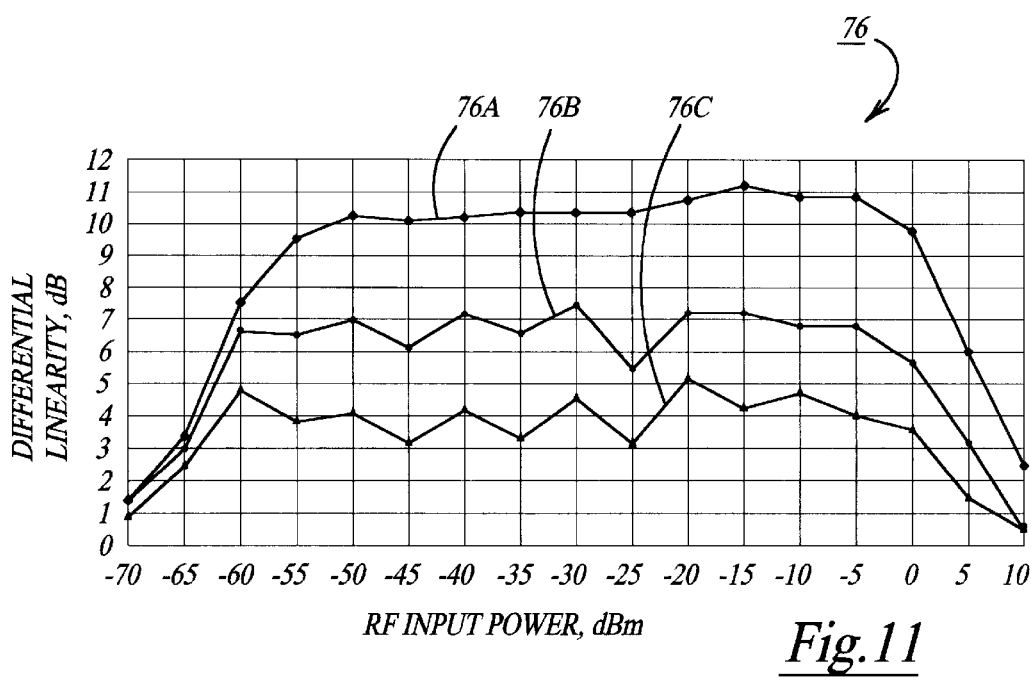
Figure 12:
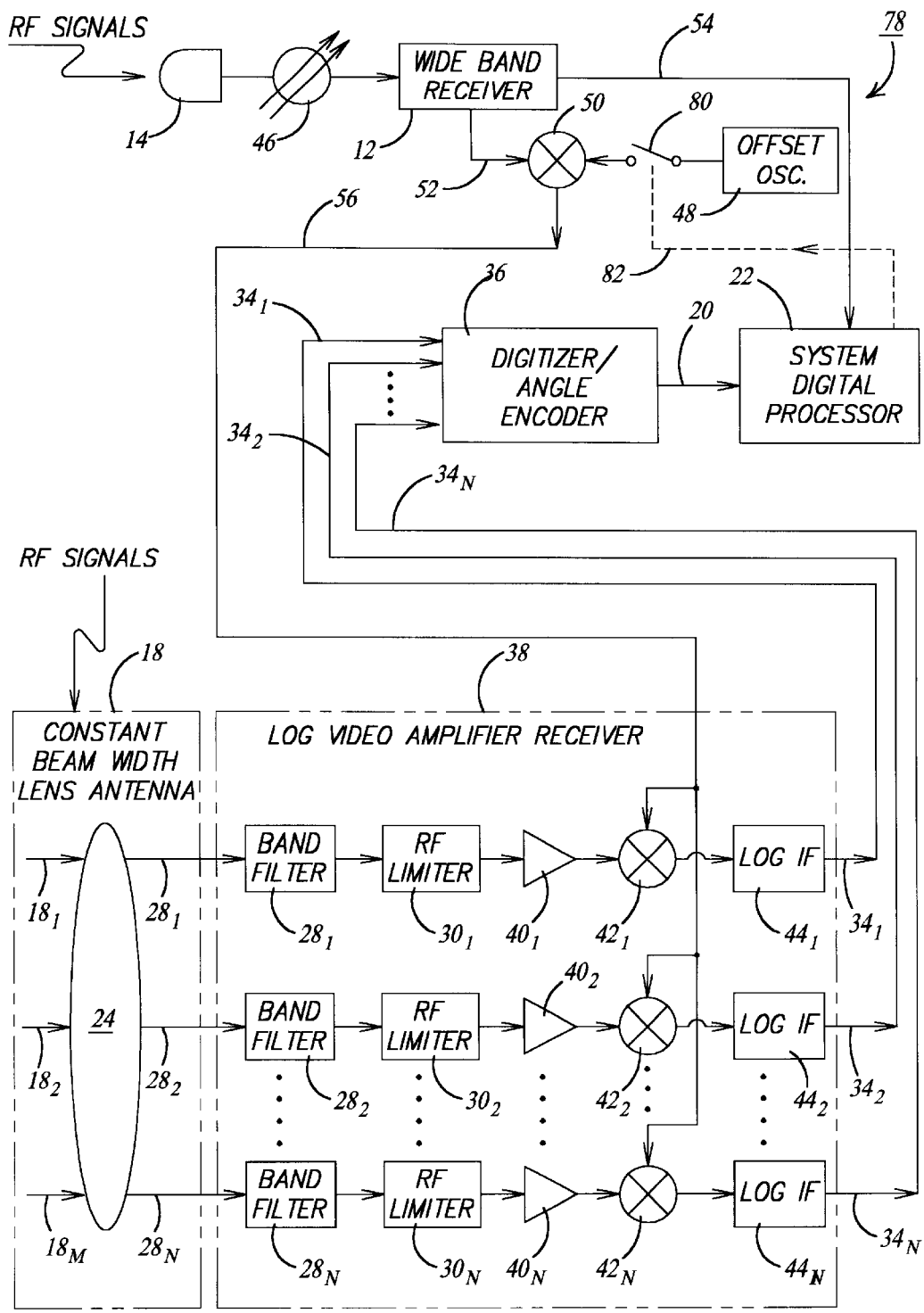
Figure 13:
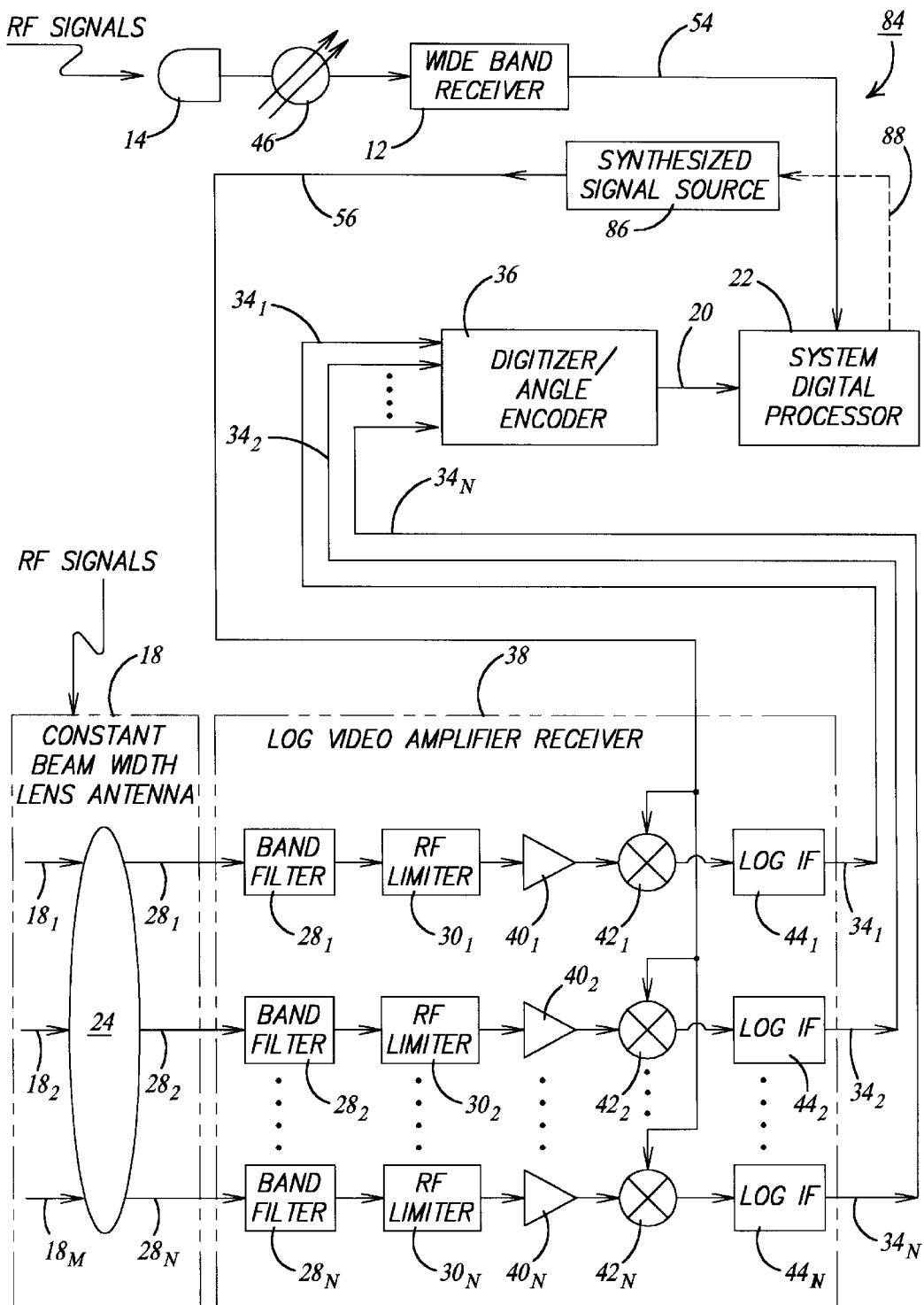

FIGS. 4(a), 4(b) and 4(c), respectively illustrate the parameters of a unit impulse, a unit pulse, and a unit triangle of the incoming RF signals received by the present invention and having the power spectral density of FIG. 3;

FIG. 5 illustrates the response of the ESM system created by a computer program in the practice of the present invention;

FIG. 6 illustrates another response of the ESM system created by a computer program in the practice of the present invention;

FIG. 7 is a block diagram of an interference suppression test setup created in the practice of the present invention;

FIG. 8 is a plot related to the interference suppression circuit test set up and showing the video output thereof;

FIG. 9 is a plot related to the interference suppression circuit test set up and showing Constant Beamwidth Lens Receiver sensitivity;

FIG. 10 illustrates a family of plots showing the Constant Beamwidth Lens Receiver amplitude video response;

FIG. 11 illustrates a family of plots showing the Constant Beamwidth Lens Receiver differential linearity response;

FIG. 12 is a block diagram of another embodiment of the ESM system of the present invention;

FIG. 13 is a further embodiment of the ESM system of the present invention; and

Figure 14:
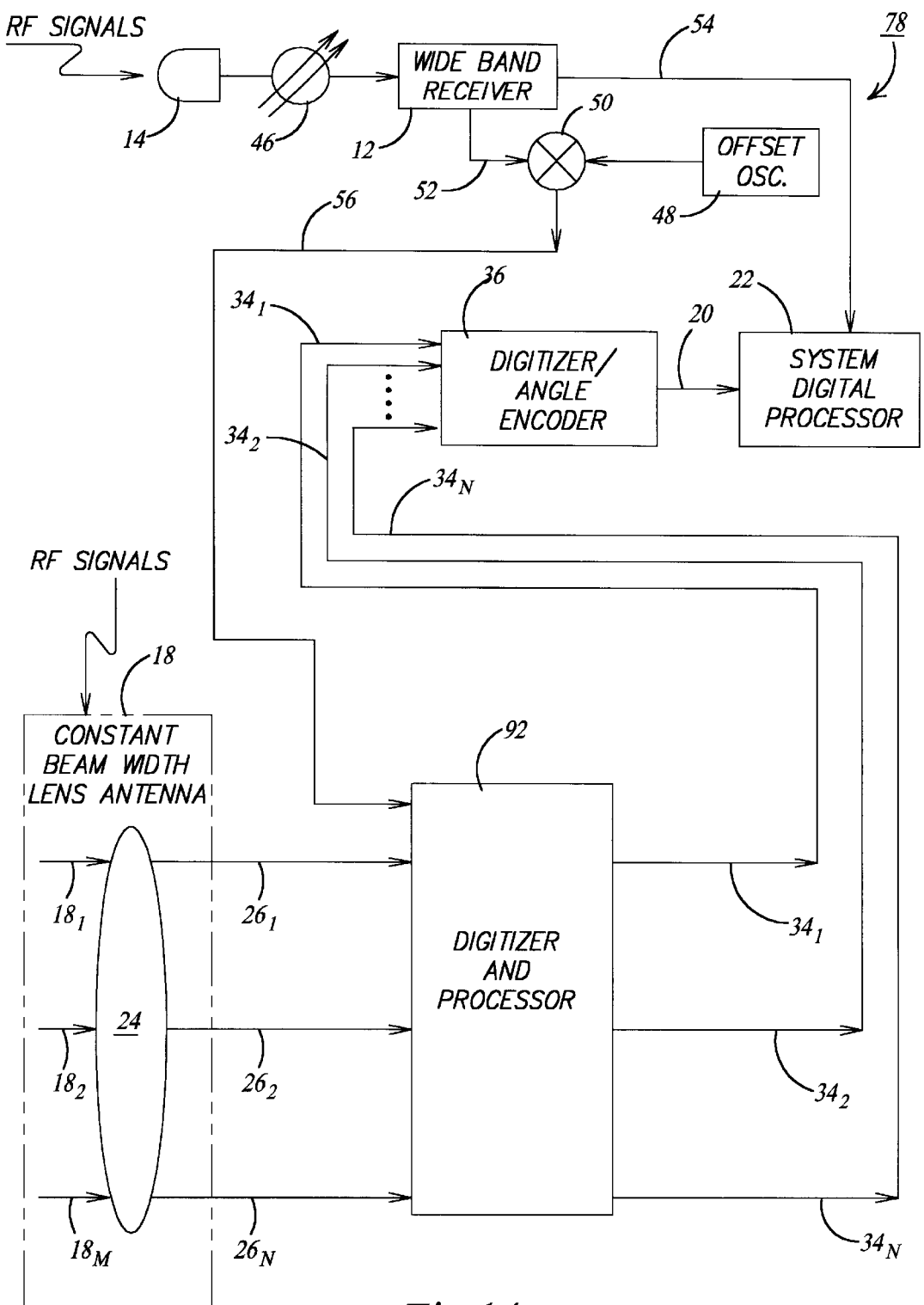

FIG. 14 is a still further embodiment of the ESM system of the present invention.

DETAILED DESCRIPTION OF THE PREFERRED EMBODIMENTS

As discussed in the "Background" section, ESM systems are plagued by local interference signals created by CW emitters located in proximity with the ESM system placed on ships. The present invention provides different embodiments, all of which reduce or even eliminate the detrimental effect of these local interference signals.

Figure 1:
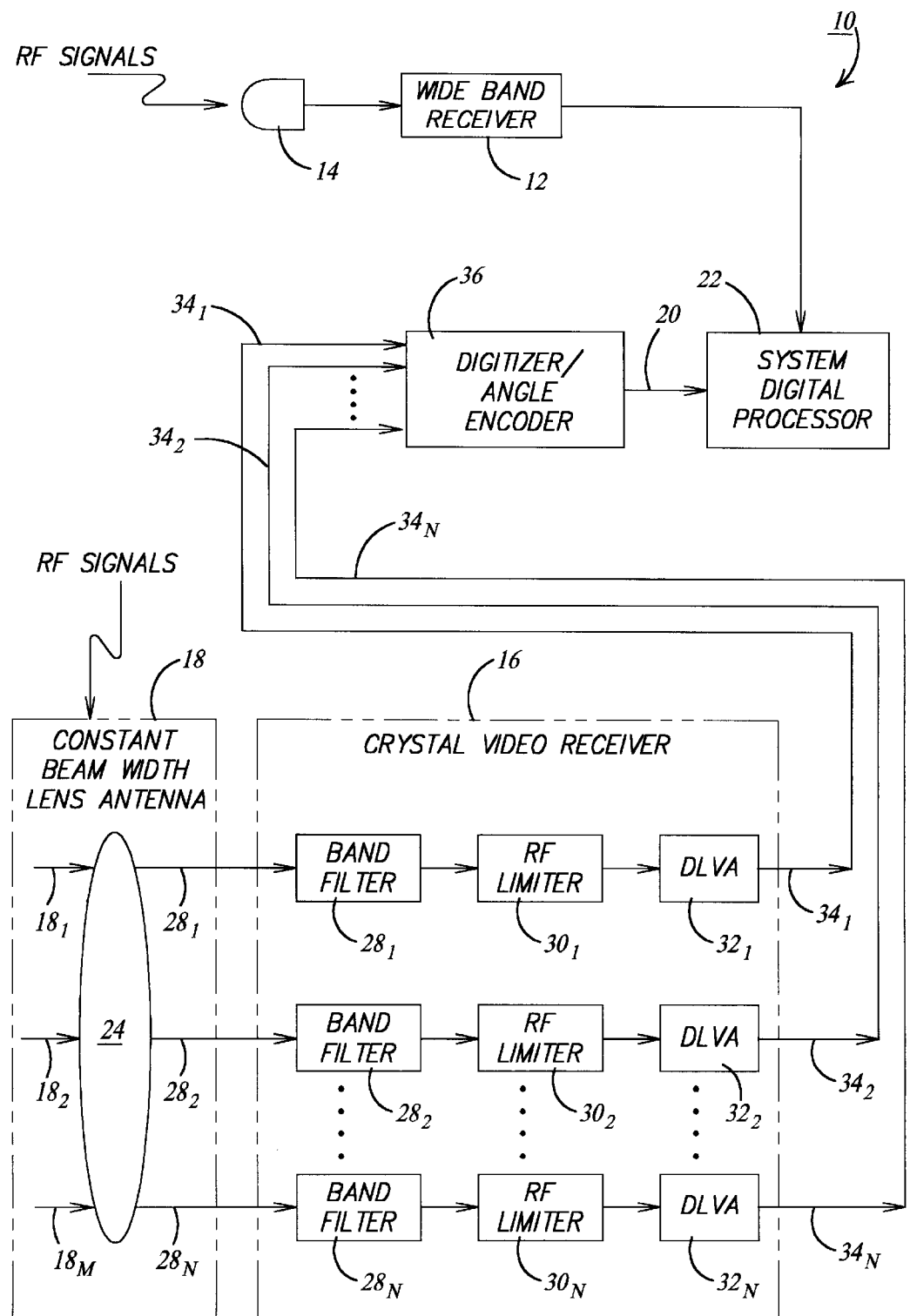
FIG. 1 is a block diagram of a prior art Electronic Support Measure (ESM) system.
Figure 2:
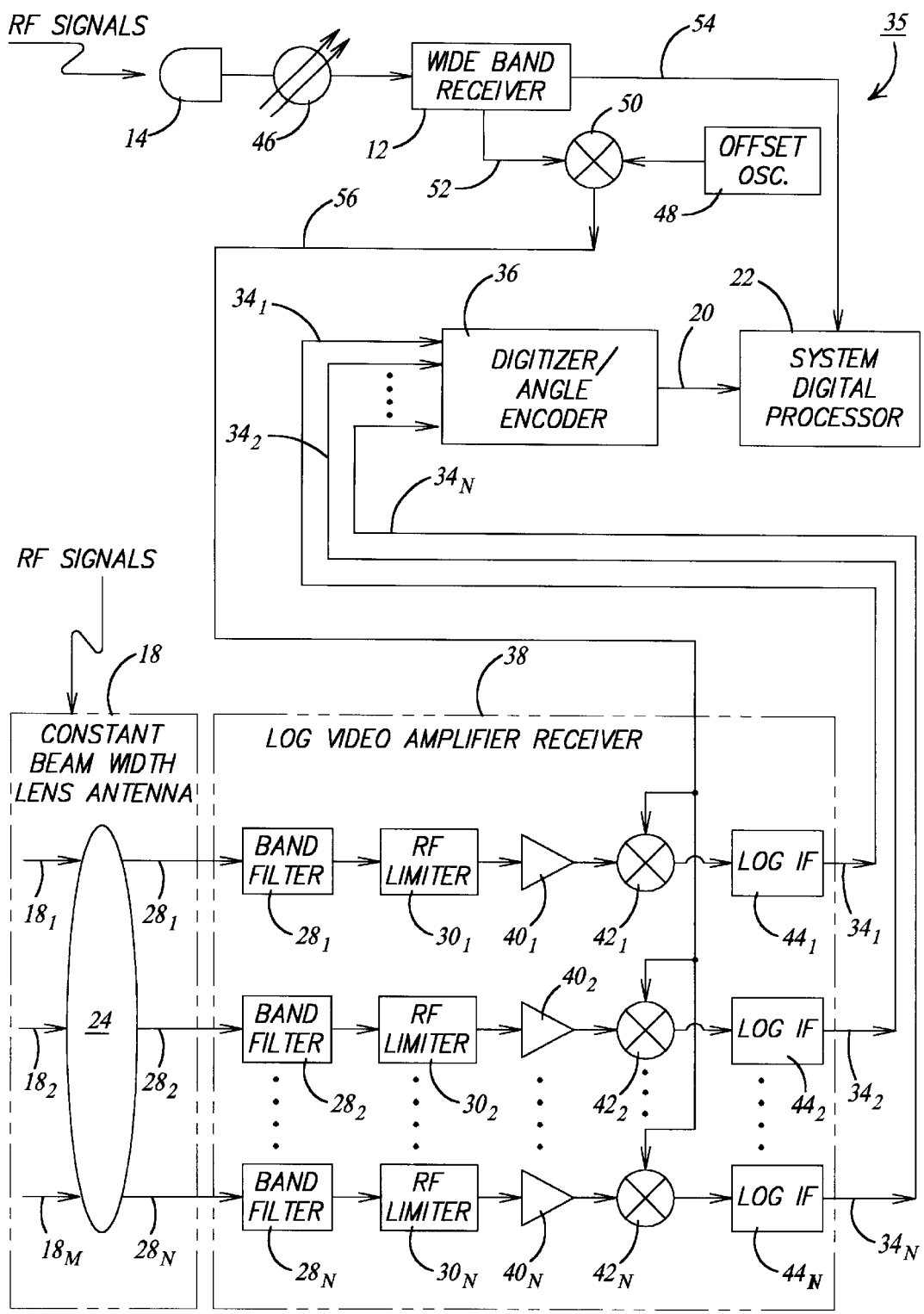
FIG. 2 is a block diagram of a ESM System in accordance with one embodiment of the present invention.

In one embodiment, the technical solution to this interference problem is provided by amplifying the RF signal, having a known frequency spectrum or band, received by the Omnidirectional antenna 14 and Wide Band Receiver 12, shown in FIG. 1, previously described, and also in FIG. 2 to be described, offsetting this received frequency band by a fixed frequency, then using this offset RF frequency signal for each of the channels of the CVR 16, converting the RF input to a fixed IF frequency (equal to the offset frequency), then using a Log Video Amplifier, to be further described with reference to FIG. 2, to produce the necessary log amplitude video signal for the determination of the quantities 20 (previously discussed in FIG. 1) by the Digitizer/Angle Encoder 36 and System Digital Processor 22. In this configuration, trapping, or notch filtering, in the single serial arrangement provided by the Omnidirectional antenna 14 and Wide Band Receiver 12 precludes the generation of RF signals by the local interfering CW emitter which can produce an IF signal utilized by the ESM system. More particularly, this configuration precludes the CW emitters from generating interference signals that are recognized by the ESM system analyzing RF signals in the offset or translated frequency spectrum. Specifically, the CW emitter does not create RF signals that cause the DLVA elements $32_1 \ldots 32_N$ to generate any IF signal outputs. The ESM system of the present invention may be described with reference to FIG. 2.

With reference to the drawings, wherein the same reference number identifies the same element throughout and, more particularly, to FIG. 2 there is shown a block diagram of the ESM system 35. From FIG. 2, it is seen that ESM system 35 employs a Log Video Amplifier Receiver (LVAR) 38, in lieu of the Crystal Video Receiver 16 of the prior art ESM system 10 of FIG. 1. More particularly, the Video Amplifier Receiver 38 does not use the DLVA elements $32_1$, $32_2, \ldots 32_N$ of the Crystal Video Receiver 16, but rather replaces elements $32_1, 32_2, \ldots 32_N$ with a serial arrangement of the RF preamplifiers $40_1, 40_2 \ldots 40_N$, first mixers $42_1$, $42_2 \ldots 42_N$ and Log IF amplifier $44_1, 44_2 \ldots 44_N$ arranged as shown in FIG. 2.

The ESM system 35 of FIG. 2 also differs from the ESM system 10 of FIG. 1 by the addition of one or more notch filters 46 which are preferably YIG tuned notch filters that provides a tunable band rejection with a notch depth greater than 50 dB over a 30 MHz bandwidth. Typically, there is a series of fixed tuned and variable notch filters. Further, the ESM system 35 includes an oscillator 48 and a second mixer 50.

In general, the configuration of the ESM system 35 of FIG. 2 differs in an arrangement and operation from the configuration of the ESM system 10 of FIG. 1 in five respects: (1) one or more notch filters have been added and placed in front of, or in series with, the Wide Band Receiver 12 input; (2) a sample of this filtered RF signal is provided by the Wide Band Receiver 12 to the first mixer 50 by way of signal path 52, but still provides the output of Wide Band Receiver 12 to the System Digital Processor, by way of signal path 54; (3) the second mixer 50, serving as a Single Side Band (SSB) mixer, shifts the filtered RF spectrum by the Offset frequency delivered by oscillator 48; (4) the shifted spectrum is provided, via signal path 56, as the Local Oscillator (LO) input to each of the first mixers $42_1, 42_2 \ldots 42_N$ and (5) the LVAR 38 of FIG. 2, is modified relative to the CRV 16 of FIG. 2, to include RF preamplifiers $40_1$, $40_2 \ldots 40_N$, first mixers $42_1, 42_2 \ldots 42_N$ and Log IF Amplifier $44_1, 44_2 \ldots 44_N$.

The present invention in one embodiment provides an arrangement and a method of operation thereof for removing the detrimental effects of the interference signals from the operational performance of the ESM system 35 receiving the incoming RF signals having a known frequency spectrum. The ESM system 35 effectively has first and second antenna subsystems with the first subsystem including the CBL lens antenna 18, and providing a plurality of parallel outputs each with signals thereat and each of the signals thereat representing the incoming RF signals. The second subsystem that includes the Omnidirectional antenna 14 provides a single serial output representative of the incoming RF signals. Each of the first and second subsystems receives and processes the same incoming RF signals.

The ESM system 35 includes the Log Video Amplifier Receiver 38 having multiple channels with each channel receiving a signal representative of the RF signals that are on signal paths $26_1, 26_2 \ldots 26_N$. The Log Video Amplifier Receiver 38 comprises first mixers $42_1, 42_2 \ldots 42_N$ with each of the first mixers $42_1, 42_2 \ldots 42_N$, having first and second inputs and an output and with the first input receiving a signal representative of the respective output of the CBL antenna 18. The output of the first mixer $42_1, 42_2 \ldots$ or $42_N$ is connected to the Log Video Amplifiers $44_1, 44_2 \ldots 44_N$ and provides an output signal comprising the output of a respective channel of the Log Video Amplifier Receiver 38.

The Omnidirectional antenna 14 receives the incoming RF signals and provides a representative output thereof. The notch filter 46 receives the output signal of the Omnidirectional antenna 14 and provides a filter output thereof. The Wide Band Receiver 12 receives the output of the notch filter 46 and provides first and second outputs respectively on signal paths 52 and 54, each representative of the output of the notch filter 46. The oscillator 48 has a predetermined frequency and provides an output signal that is routed to the second mixer 50.

The second mixer 50 has first and second inputs and an output with the first input receiving the first output of the Wide Band Receiver 12 and a second input receiving the output on the oscillator 48. The output of the second mixer 50 is connected, via signal path 56, to the second input of each of the first mixers $42_1, 42_2 \ldots 42_N$.

The Digitizer/Angle Encoder 36 is connected to receive each of the output video signals on signal paths $34_1, 34_2 \ldots 34_N$ provided by each of the channels of the Log Video Amplifier Receiver 38. The Digitizer/Angle Encoder 36 provides output quantities 20 representative of the amplitude, pulse width and time of arrival (TOA) of the incoming RF signals and direction finding (D/F) data. These quantities 20 are routed to the System Digital Processor 22. The System Digital Processor 22 manipulates the output quantities 20 in a manner as previously discussed with reference to FIG. 1, along with the RF signal generated by the Wide Band Receiver 12 and present on signal path 54.

A mathematical analysis of the operation of the interference suppression system 35 of FIG. 2 may be described with reference to FIGS. 3 and 4, wherein FIG. 4 is composed of FIGS. 4(A), 4(B) and 4(C).

FIG. 3 illustrates the RF input power spectrum density such as that of the incoming RF signals of FIGS. 1 and 2.

FIG. 4 illustrates standard transforms related to the incoming RF signals of FIGS. 1 and 2, wherein FIG. 4(A) illustrates a unit impulse along with its mathematical terms, FIG. 4(B) illustrates a unit pulse along with its mathematical terms, and FIG. 4(C) illustrates a unit triangle along with its mathematical terms.

In the mathematical analysis, the Omnidirectional antenna 14 of FIG. 2 is referred to as the Semi-omni Antenna 14. Furthermore, the mathematical analysis herein is to refer, in parenthesis, to the elements and signal paths of the test set-up arrangement shown in FIG. 7 to be described hereinafter so as to better describe the operation of the ESM system 35.

The Semi-omni Antenna 14 and CBL Antenna 18 outputs are independently amplified and filtered. Each presents a filtered output Power Spectral Density as shown in FIG. 3. The signal power, P, associated with antennas 14 and 18, is located at radian frequency, $\omega_c$; the noise power, A, dimensioned as watts per radian per second, is constant over bandwidth $\omega_{\beta}$, centered at frequency $\omega_o$. For clarity, $P_{so}$ and $A_{so}$ are used to represent the signal and noise power, respectively, for the Semi-omni Antenna 14 channel; similarly, $P_{CBL}$ and $A_{CBL}$ represent the signal and noise power, respectively, for a CBL Antenna 18 channel.

The signal and noise from the Semi-omni Antenna 14 at the input to the SSB mixer 50 of FIG. 2 (on FIG. 7 at the output of "AR2" on signal path 58) are represented as $S_1(\omega)$:

$$S_1(\omega) = A_{so}\left[U\left(\omega + \omega_o + \frac{\omega_\beta}{2}\right) - U\left(\omega + \omega_o - \frac{\omega_\beta}{2}\right) + U\left(\omega - \omega_o + \frac{\omega_\beta}{2}\right) - U\left(\omega - \omega_o - \frac{\omega_\beta}{2}\right)\right] + P_{SO}[\delta(\omega + \omega_o) + \delta(\omega + \omega_o)]$$

where $U(\omega)$ is the unit step ($U(\omega)=1$ for $\omega>0$, $U(\omega)=0$ elsewhere), and $\delta(\omega)$ is the unit impulse (See FIG. 4(A)).

The shifted RF spectral density from the SSB mixer 50 on signal path 56 of FIG. 2 (on FIG. 7, at the output of "AR3" on signal path 60) can then be represented as $S_2(\omega)$, where:

$$S_2(\omega) = A_{so}\left[U\left(\omega + \omega_o + \omega_c + \frac{\omega_\beta}{2}\right) - U\left(\omega + \omega_o + \omega_c - \frac{\omega_\beta}{2}\right) + U\left(\omega - \omega_o - \omega_c + \frac{\omega_\beta}{2}\right) - U\left(\omega - \omega_o - \omega_c - \frac{\omega_\beta}{2}\right)\right] + P_{so}[\delta(\omega - \omega_o - \omega_c) + \delta(\omega + \omega_o + \omega_c)]$$

A similar expression for the CBL antenna 18 power spectral density into a CBL channel mixer (on FIG. 7, at the output of "FL2" on signal path 62) is expressed as $S_3(\omega)$, where:

$$S_3(\omega) = A_{CBL}\left[U\left(\omega + \omega_o + \frac{\omega_\beta}{2}\right) - U\left(\omega + \omega_o - \frac{\omega_\beta}{2}\right) + U\left(\omega - \omega_o + \frac{\omega_\beta}{2}\right) - U\left(\omega - \omega_o - \frac{\omega_\beta}{2}\right)\right] + P_{CBL}[\delta(\omega - \omega_o) + \delta(\omega + \omega_o)]$$

It should be noted that the autocorrelation function is the Fourier Transform of the Power Spectral Density:

$$R_2(T) \stackrel{F}{\Leftrightarrow} S_2(\omega) \text{ and: } R_3(T) \stackrel{F}{\Leftrightarrow} S_3(\omega)$$

where:

$$R_2(T) = 2A_{so} \cdot \cos(\omega_o + \omega_c)T \cdot \frac{\sin\left(\frac{\omega_\beta T}{2}\right)}{\pi T} + \frac{P_{so}}{\pi} \cdot \cos(\omega_o + \omega_c)T$$

A similar result is obtained for the CBL output spectrum related to CBL antenna 18:

$$R_3(T) = 2A_{CBL} \cdot \cos\omega_o T \cdot \frac{\sin\left(\frac{\omega_\beta T}{2}\right)}{\pi T} + \frac{P_{CBL}}{\pi} \cdot \cos\omega_o T$$

The mixer in the CBL receiver path, that is, the first mixers $42_1$, $42_2$ . . . $42_N$ is considered a time domain multiplier, with an output autocorrelation function, $R_4(T)$:

$$R_4(T) = R_{23}^2(0) + R_2(T) \cdot R_3(T) + R_{23}(T) \cdot R_{23}(T)$$

The terms involving $R_{23}(T)$ represent the cross correlation between the spectrum, as received via the CBL Antenna 18, and the frequency shifted spectrum, from the Semi-omni Antenna 14, in particular, the off-set oscillator 48. Assuming that the offset frequency (in the embodiment of FIG. 2, equal to 160 MHz) is sufficiently high as to assure video integration over multiple cycles of the offset frequency, then we conclude that:

$$R_{23}(T)=0$$

then:

$$R_4(T)=R_2(T) \cdot R_3(T)$$

Carrying out the multiplication produces:

$$R_4(T) = \frac{4A_{so} \cdot A_{CBL}}{\pi^2 T^2} \cdot \cos\omega_o T \cdot \cos(\omega_o + \omega_c)T \cdot \sin^2\left(\frac{\omega_\beta T}{2}\right) +$$

$$\frac{2}{\pi^2} \cdot (A_{CBL} \cdot P_{so} + A_{so} \cdot P_{CBL}) \cdot \cos(\omega_o T) \cdot \cos(\omega_o + \omega_c)T \cdot \frac{\sin\left(\frac{\omega_\beta T}{2}\right)}{T} +$$

$$\frac{P_{CBL} \cdot P_{so}}{\pi^2} \cdot \cos(\omega_o T) \cdot \cos(\omega_o + \omega_c)T$$

But, the identity:

$$\cos(\omega_o + \omega_c)T \cdot \cos\omega_o T = \frac{1}{2}[\cos(2\omega_o + \omega_c)T + \cos\omega_c T]$$

allows the discarding of the terms in $2\omega_o$, simplifying the expression to:

$$R_4(T) = \frac{2A_{SO} \cdot A_{CBL}}{\pi^2 T^2} \cdot \cos\omega_c T \cdot \sin^2\left(\frac{\omega_\beta T}{2}\right) +$$

$$\frac{4}{\pi^2} \cdot (A_{CBL} \cdot P_{SO} + A_{SO} \cdot P_{CBL}) \cdot \cos\omega_c T \cdot \frac{\sin\left(\frac{\omega_\beta T}{2}\right)}{T} +$$

$$\frac{2P_{CBL} \cdot P_{SO}}{\pi^2} \cdot \cos\omega_c T$$

The output power spectral density of the CBL channel mixer associated with the CBL antenna 18, $S_4(\omega)$ is the Fourier Transform of the preceding equation:

$$S_4(\omega) = \frac{A_{SO} \cdot A_{CBL} \cdot \omega_\beta}{2\pi} [q_{\omega\beta}(\omega - \omega_c) +$$

$$q_{\omega\beta}(\omega + \omega_c)] + \left[\frac{A_{SO} \cdot P_{CBL} + A_{CBL} \cdot P_{SO}}{2\pi}\right] \cdot \left[p_{\frac{\omega\beta}{2}}(\omega - \omega_c) +\right.$$

$$\left. p_{\frac{\omega\beta}{2}}(\omega + \omega_c)\right] + \frac{P_{SO} \cdot P_{CBL}}{2\pi} \cdot [\delta(\omega - \omega_c) + \delta(\omega + \omega_c)]$$

This last equation is the Power Spectral Density at the output of the CBL channel mixer, that is, the first mixers $42_1$, $42_2$, ... $42_N$ (in FIG. 7 on signal path 60 going into "FL3"). The first line of the above expression is the Noise×Noise component; the middle line of the above expression is the Signal×Noise component; the last line of the above expression is the Signal×Signal component. From the above, it is seen that the Noise×Noise produces a triangular component, as FIG. 4(C); the Signal×Noise is centered on $\omega_c$, and is flat over $\omega_\beta$ radians per second. The Signal×Signal component, as expected, consists of line spectra at $\omega_c$ radians per second.

Filter "FL3" of FIG. 7, to be described hereinafter, is centered at $\omega_c$ with bandwidth, $\omega_{if}$. The RMS power out of this filter FL3 is:

$$R_4(0) = \frac{1}{2\pi} \int_{\omega_c - \frac{\omega_{if}}{2}}^{\omega_c + \frac{\omega_{if}}{2}} S_4(\omega) d\omega$$

Carrying out the integration, the power out of filter "FL3" is, approximately:

$$R_4(0) \cong \frac{A_{SO} \cdot A_{CBL} \cdot \omega_\beta \cdot \omega_{if}}{\pi^2} + \frac{(A_{SO} \cdot P_{CBL} + A_{CBL} \cdot P_{SO})}{\pi^2} \cdot \omega_{if} + \frac{P_{SO} \cdot P_{CBL}}{2\pi^2}$$

The approximation involved in the preceding equation is the assumption that $\omega_c$ (typically, 160 MHz) is much less than $\omega_\beta$ of the incoming RF signals of FIGS. 1 and 2 (typically more than 4 GHz). This allows the assumption that $q_{\omega\beta}$ approximates unity, substantially simplifying the integral. Note that, because of this frequency relationship, the positive frequency functions overlap the negative frequency functions, doubling the noise power in the region of $\omega_c$. That is the reason for the factor of two scaling differences between the Signal×Signal term and the two noise terms.

$R_4(0)$ is the total power at the output of the CBL channel ahead of a Log IF Amplifier $44_1$, $44_2$, . . . $44_N$. It may be observed that, because of the limiting action at the output of the SSB Mixer 50, the sum: $A_{so} \omega\beta + P_{so}$ is a constant. The IF SNR is simply the ratio:

$$SNR = \frac{P_{SO} \cdot P_{CBL}}{2A_{SO} \cdot A_{CBL} \cdot \omega_\beta \cdot \omega_{if} + 2(A_{SO} \cdot P_{CBL} + A_{CBL} \cdot P_{SO}) \cdot \omega_{if}}$$

bandwidths: 4 GHz and 12 GHz assigned to the frequency spectrum of the incoming RF signals. The results are shown in FIGS. 5 and 6 showing family of plots 64 and 66 respectively. FIG. 5 represents a hypothetical 2–6 GHz Wide Band Receiver 12, assuming a 160 MHz IF output from the offset oscillator 48, with 30 MHz IF bandwidth provided by the Log IF 44. The Semi-omni Antenna 14 is assumed to exhibit 6 dB loss between the antenna output and the preamplifier contained in the Wide Band Receiver 12, under this assumption, tunable notch filters 46 limiters, and bandpass filters contained and (not shown in FIG. 2) in the Wide Band Receiver 12; the Semi-omni antenna 14 first gain stage may exhibit a 6 dB Noise Figure.

Two plots 64A and 64B are shown on FIG. 5 and using the left side ordinate thereof, the plot 64A is the total IF power to the input of the Log IF elements $44_1$, $44_2$ . . . $42_N$. The vertical intercept 64C of FIG. 5 indicates the processing threshold for the Hemisphere Receiver, that is, the ESM system 35. This processing threshold is the minimum RF input on signal paths $26_1$, $26_2$ . . . $26_N$ (SNR) that can produce the desired accuracy of digital encoding of RF frequency, RF pulse width, TOA, and RF peak amplitude. Using these assumed parameters, the Hemisphere Receiver processing sensitivity is –66 dBm. The right side ordinate of FIG. 5 is the signal to noise ratio (SNR) at the input to the Log IF elements $44_1$, $44_2$ . . . $42_N$. The intercept, defined by reference lines 64D and 64E, is at the +15 dB IF SNR point, which is assumed to be the minimum IF SNR for useful Angle of Arrival (AOA) processing. This minimum value translates to a CBL antenna output signal-to-noise (SNR) of –64 dBm.

FIG. 6 essentially repeats the data of FIG. 5, but analyzes a hypothetical receiving system, such as ESM system 35 handling incoming RF signals having a frequency spectrum of 6–18 GHz. Note that higher RF noise levels, due to wider or increased RF bandwidth, are assumed in this higher band relative to that of FIG. 5. In this case for FIG. 6, the Hemisphere Receiver, such as the ESM system 35, processing threshold is –59 dBm, and the minimum CBL antenna output on signal paths $26_1$, $26_2$ . . . $26_N$ for +15 dB IF SNR is –61 dBm.

In a further practice of the invention, an interference suppression test set-up 68 was arranged and is shown in FIG. 7. This test set-up 68 allowed confirmation of sensitivity and rejection of selected frequencies using a YIG tuned notch filter 46 of FIG. 2. Each of components of FIG. 7 employed in the experiment is shown in Table 1 and identified therein by their manufacturer and model number except for the attenuator shown therein which are of conventional types.

TABLE 1

| ELEMENT | FUNCTION | MANUFACTURER | MODEL NUMBER |
|---|---|---|---|
| AR1, AR2, AR3, AR4, and AR5 | Amplifiers | Aldetec | ALSOO371 |
| A1 | YIG Notch Filter | Omniyig | MR.1959D |
| AT1 | Attenuator (10 dB) | Conventional Type | |
| AT2 | Attenuator (16 dB) | Conventional Type | |
| AT3 | Attenuator (selectable dB) | Conventional Type | |
| FL1, FL2, and FL3 | Filter | TTE | K4582-5750/8250M-A |
| M1 | Mixer | Miteq | SMO618LC2MDC |
| XO | 160 MHz Oscillator | Wiltron | 68347B |
| DC1 | Power Divider | Mac Technology | P82482 |
| M2 | Mixer | Miteq | DBO218LW2 |
| FL4 | Filter | TTE | KC6-160M-20M-50-69A |
| A2 | Log IF Amplifier | Miteq | L1FD-160-40P-80BC |
| SG | Signal Generator | Wiltron | 68347B |

In FIG. 7, the RF input to the Omnidirectional Receiver (shown in FIG. 2 as comprising omnidirectional antenna 14, notch filter 46, wide band receiver 12, offset oscillator 48 and second mixer 50), including the RF preamplifier (AR1), YIG tuned notch filter (A1), amplifier (AR2), filter (FL1), SSB Mixer (M1), filter (FL3), and LO amplifier (AR4), is obtained via a Mac Technology power divider. This presents the same RF signal inputs to both the Omnidirectional Receiver and the CBL Receiver (shown in FIG. 2 as comprising LVAR 38). The CBL Receiver, consisting of the RF preamplifier (A5), mixer (M2), IF filter (FL2), and Log IF Amplifier (A2), drives an Oscilloscope display, allowing the measurement and recording of Tangential Sensitivity (Tss), known in the art, and video output level, as functions of the RF input level (from a frequency synthesizer, not shown) and the relative frequency position of the YlG tuned notch filer (A1).

Referring to Table 1, it should be noted that these components were employed because of their availability, and do not represent an optimum design. A Wiltron 68347B synthesizer was employed as a signal source presented to both the Omnidirectional Antenna and the CBL Antenna outputs, via Mac Technology power divider DC1. Since, in practice, the Omnidirectional and CBL Antennas 14 and 18, respectively, are physically adjacent, it is useful to employ the same RF drive into both associated receivers of these antennas 14 and 18. The attentuator AT3 has a dB parameter which is selectable to simulate the relative gain of the CBL antenna 18 relative to the Semi-Omni Antenna 14. The attenuators AT1 and AT3, having their values of Table 1, are interposed, as shown in FIG. 7, to provide a balancing effect between the signal paths associated with the CBL antenna 18 and the Semi-Omni Antenna 14.

Referring to FIG. 7, the Omnidirectional Receiver input is at the input to RF Amplifier AR1, acting as an RF preamplifier. The YlG tuned notch filter, A1, following AR1, provides a tunable band rejection capability with a notch depth greater than 50 dB over a 30 MHz bandwidth. RF amplifier AR2 follows the YlG notch filter A1, and drives the SSB Mixer, M1, through wide band filter FL1. The SSB Mixer, M1, translates the RF input spectrum, shifting it by the Offset Frequency, as provided by the Local Oscillator input from the 160 MHz XO. In other words, an RF input frequency of 8.00 GHz, from FL1, appears at the SSB Mixer, M1, output as 8.16 GHz, with the 8.00 GHz RF input and the image (at 7.84 GHz) suppressed. The effect of the SSB Mixer, M1, is to shift the RF input spectrum, including both signals and noise, by the Offset Frequency of 160 MHz The shifted spectrum output from SSB Mixer, M1, is filtered and amplified by the sequence of components FL2, AR3, FL3, and AR4. For all RF input frequencies other than the RF frequency suppressed by the YlG notch filter, A1, the RF gains are chosen such that the RF output of AR4 is in limiting, providing a constant Local Oscillator input to Mixer M2. Note that, if this were a full system implementation, with multiple CBL Receiver channels previously discussed, the output of RF Amplifier AR4 would be distributed to each of the CBL Channels, identified in FIG. 7 as the "LOG VIDEO RECEIVER".

The RF signal presented to the input of AR1, representing the input to the Omnidirectional Receiver (shown in FIG. 2 as comprising elements 14, 46, 12, 48 and 50), is also presented to the input of RF Amplifier AR5, the Log Video Receiver RF preamplifier. The primary function of AR5 is to provide reverse isolation. More particularly, if the input to M2, by way of AR4, is in the same RF band as the input to the AR1 receiver, without AR5, the system of FIG. 7 would break into oscillation. The output of AR5 is provided as the RF input to Mixer M2. As noted previously, the LO input to Mixer M2 is provided by RF Amplifier AR4. Assume, for example, that the Signal Generator, representing the incoming RF signals of FIG. 2, is set to produce an 8 GHz output frequency, and that the YlG notch filter A1 is tuned to some frequency other than 8 GHz. The output of the SSB Mixer M1 is 8.16 GHz, and that is the LO frequency provided to Mixer M2. Since the RF input to Mixer M2 is 8.00 GHz, then the product of the LO and RF mixer inputs is fixed at 160 MHz, irrespective of the Signal Generator output frequency which, in turn, responds in a similar manner irrespectively of the incoming RF signals of FIG. 2.

The 160 MHz IF output from Mixer M2 is filtered by FL4, then is logarithmically detected and amplified by Log IF Amplifier A2. The magnitude of the RF signal from FL4 appears as a video voltage, linear, in dB, at the Log IF Amplifier A2 output. Since the desired output of FL4 is always 160 MHz, the bandwidth of FL4 is determined by the frequency stability of the 160 MHz XO and the rise time required to support pulsed RF input signals.

Now, consider that if the YlG tuned notch filter, A1, is tuned to the same frequency as that produced by the Signal Generator, the attenuation of the YlG tuned notch filter, A1, (at that particular RF frequency) is sufficient to reduce the RF input to SSB Mixer M1, and, thereby, reduce the LO input to Mixer at M2. The effect is to reduce the output of Mixer M2 and, consequently, reduce the video output voltage from the Log IF Amplifier, A2. Consequently, the YlG notch filter A2 or notch filter 46 of FIG. 2 in the Omnidirectional Receiver will suppress not only the Omnidirectional Receiver response at the RF frequency selected by the notch filter, but also the response of all of the CBL Receiver channels at that same frequency, without having to place notch filters in each of the CBL Receiver channels. These conclusions are applicable to both the test set-up shown in FIG. 7, and the actual ESM System 35 of FIG. 2 as well as other embodiments to be described hereinafter.

In a still further practice of the present invention, the circuit illustrated in FIG. 7 was implemented and tested with the results thereof given in FIGS. 8 and 9, respectively, illustrating the video output and constant beamwidth lens receiver sensitivity, respectively, of the interference suppression circuit of the present invention. This was a two part test: the first part, with the results provided by FIG. 8 identifying a plot 70, inserted a pulsed RF input to both the Omnidirectional (input to AR1) and CBL Receivers (input at AR5) at 8.00 GHz. The YlG notch filter A1 was set to approximately 7.50 GHz. The Tangential Sensitivity (Tss), known in the art, was then measured (at −76 dBm), and the RF input level was increased in 5 dB steps, noting the resultant video output voltage. The best-fit straight line 70A is plotted on the data, indicating excellent log linearity to approximately −20 dBm RF input identified by reference number 70B. The RF input level recorded was the indicated RF output of the Signal Generator; no correction was made for cable loss or the loss of the Mac Technology power divider.

The second test moved the YlG notch filter A1 to 8.000 GHz, and the Signal Generator was stepped from 7800 MHz to 8200 MHz, in 5 MHz steps. The Tangential Sensitivity (Tss) was then measured at each RF test frequency, with the results indicated and identifying as plot 72. The YlG notch frequency 8.000 GHz is identified by reference number 72A. Note that the measured Tss was about the same at 7950 MHz (−68 dBm) and at 8050 MHz (−70 dBm). This was about the same measured Tss (−76 dBm) as in FIG. 6 at 8000 MHz without the YlG notch. As the RF frequency approached the YlG notch frequency (8.000 GHz), the required input level for Tss increased, reaching a maximum of −33 dBm at 8000 GHz; the notch filter in the Omnidirectional Receiver (shown in FIG. 2 as composed of elements 14, 46, 12, 48 and 50), caused the CBL Receiver (shown in FIG. 2 as composed of LVAR 38) to desensitize by 43 dB at the notch frequency (8.000 GHz), without affect to other frequencies present, assuming a minimum 50 MHz separation from the selected YIG notch frequency. The depth of the desensitization is dependent on the YIG filter characteristics, the amount of excess RF gain in the limiting RF Amplifier, AR4, and the LO drive characteristics of the Mixer, M2.

FIGS. 8 and 9 demonstrate the essential characteristics of this interference suppression design approach of the ESM System 35 of FIG. 2; that is, selected frequencies in multiple CBL Receiver channels can be suppressed by a single notch filter in the Omnidirectional Receiver path.

During the testing of FIG. 7, further observation was made. For example, Tss was estimated by setting the RF input to such a level that a pulsed RF input in the presence of noise appeared to ride on the peaks of the noise in the absence of signal. This level approximates an 8.5 dB IF Signal to Noise Ratio (SNR). In addition, it is often useful to temporarily blank the video response from the CBL Receivers, particularly in the presence of very high power emitters, such as own-ship radar transmitters, which often radiate pulses in the megawatt range. This can be accomplished in this design by switching off the 160 MHz XO, effectively desensitizing all of the CBL Receiver Channels simultaneously. This blanking operation is to be further described hereinafter with reference to the embodiment shown in FIG. 12.

Further testing using the test set of FIG. 7 was performed and the results thereof are given on FIGS. 10 and 11 showing family of curves 74 and 76, respectively. FIG. 10 illustrates the CBL Receiver amplitude video response for 0 dB, -3 dB, -6 dB and -10 dB antenna 18 gains corresponding to plots 74A, 74B, 74C, and 74D. The plots 74A, 74B, 74C and 74D are the responses as a function of a RF input power level. FIG. 11 illustrates the CBL receiver differential linearity antenna 18 gains of -10 dB, -6 dB, and -3 dB corresponding to plots 76A, 76B, and 76C. The plots 76A, 76B and 76C, respectively illustrate the differential gain for the -3 dB, -6 dB, and -10 dB attenuator values, relative to the 0 dB response.

It should now be appreciated that the practice of the present invention provides an ESM system that substantially reduces or even eliminates the detrimental effects of interference signals generated by external CW emitters. Further, it should be appreciated that this interference suppression is accomplished by adding a minimum amount of logic to the single serial arrangement related to the Omnidirectional antenna 14 and with even less logic added to each channel of the receiver associated with a Constant Beamwidth Lens antenna 18.

The ESM system 35 of the present invention can selectively desensitize a multi-channel receiver of a CBL antenna to one, or more RF input signal frequencies, by selectively suppressing one or more RF input frequencies in a parallel arranged single serial channel receiver, offsetting the RF spectrum of that single channel receiver by a fixed frequency, amplifying this offset spectrum, limiting and providing this offset and limited amplitude spectrum as a Local Oscillator input to one or more parallel RF channels serving the CBL antenna. These parallel RF channels mix the shifted RF spectrum with the originally received RF input, producing a fixed higher frequency signal which exhibits a proportional amplitude response to the RF input signal, except at those RF frequencies that were suppressed. The single serial channel comprises the Ominidirectional antenna. The parallel RF channels comprises the CBL antenna. Although Omnidirectional and CBL antennas receive essentially the same RF input, the channels of the CBL antenna will have reduced sensitivities to its RF frequencies that were suppressed in the single channel comprising the Omnidirectional antenna.

In operation, the essential elements are to receive an RF signal in one channel, suppress one or more RF frequency segments in the received RF signal, translate the received RF spectrum by a fixed offset frequency, amplify the translated RF spectrum into a limiting condition, except at those translated RF frequency segments which were suppressed prior to translation. The operation then uses this limited signal as an input into mixers in one or more parallel RF channels servicing the CBL lens antenna that have received the original RF signal. The mixers in the parallel RF channels provide an output at a fixed offset frequency with the amplitude thereof being proportional to the received RF signal, except that those RF frequency segments that were suppressed prior to translation. The parallel RF channel mixer outputs at the offset frequency are reduced when the RF input signal is in a suppressed RF frequency segment.

A further embodiment related to the present invention and implementing the blanking operation previously mentioned, may be further described with reference to FIG. 12 showing an arrangement 78. The arrangement of FIG. 12 is quite similar to that of FIG. 2 with the exception of the addition of an electronic switch 80 and a signal path 82 carrying a signal generated by System Digital Processor 22 for controlling the electronic switch 80.

In operation, a blanking signal is provided by way of a control signal on signal path 82 generated by the System Digital Processor 22 having a routine running therein which has knowledge of the activation of own-ship's high power pulsed signal so that the electronic switch 80 is not enabled which, in turn, prevents the presence of any signal on signal path 56, which, in turn, inhibits the associated first mixer $42_1, 42_2 \ldots 42_N$ from processing any RF signals coming in on a associated signal paths $26_1, 26_2 \ldots 26_N$. The result thereof is that these associated channels are blanked in the presence of very high power pulsed emitters, such as own-ship radar transmitters.

A further embodiment of the ESM system of the present invention may be further described with reference to FIG. 13, showing a circuit arrangement 84. FIG. 13 is quite similar to the arrangement of FIG. 2 with the exception that the first mixer 50 is deleted and the offset oscillator 48 is replaced by a synthesized signal source 86. The synthesized signal source 86 is controlled by a routine running in System Digital Processor 22 by way of signal path 88. The synthesized source 86 allows the receiving channels of the Log Video Amplifier Receiver to act as a parallel array of superheterodyne receivers that are synchronized relative to each other.

A further embodiment of the present invention may be further described with reference to FIG. 14 showing a circuit arrangement 90. The circuit arrangement 90 is quite similar to that of FIG. 2 with the exception that the LVAR 38 is replaced by a digitizer and processor 92. The digitizer and processor 92 operates, in a manner as previously described for the Voltage Video Amplifier Receiver 38, with the exception that it receives analog information on signal path $26_1, 26_2 \ldots 26_N$ and converts these analog quantities to digital functions. Further, the digitizer and processor 92 receives the analog quantity on signal path 56 and converts it to a digital quantity. The digitizer and processor 92 has routines residing therein for converting the received analog quantities to digital quantities and converting these digital quantities to the IF signals previously discussed for LOG IF elements $44_1 \ldots 44_N$. The quantities appearing on signal paths $26_1, 26_2 \ldots 26_N$ and 56 are combined in a manner as previously described with reference to the Digitizer Angle Encoder 36 of FIG. 2, so as to produce the output quantities 20 that are operated on by the System Digital Processor 22 also previously discussed with reference to FIG. 2.

It should now be appreciated that the practice of the present invention provides for various embodiments each designed for removing interfering signals from the frequency spectrum of incoming RF signals so as to provide for improved performance of the associated ESM system.

Obviously, many modifications and variations of the present invention are possible in light of the foregoing teachings. It is therefore, to be understood that within the scope of the independent claims of the invention may be practiced as otherwise described.

What I claim is:

1. An electronic support measure (ESM) system providing interference suppression and having a constant beamwidth lens (CBL) antenna receiving incoming RF signals and providing a plurality of output signals, said ESM system comprising:

a) a log video amplifier receiver having multiple channels with each channel receiving a respective one of said plurality of output signals of said CBL antenna each channel of, said log video amplifier receiver comprising a first mixer having first and second inputs and an output and with the first input receiving a signal representative of said respectively output signal of said CBL antenna, said output of said first mixer connected to a logarithmic amplifier which provides an output video signal comprising the output signal of the respective channel of said log video amplifier receiver;

b) an omnidirectional antenna receiving said incoming RF signals and providing a representative output thereof;

c) a notch filter receiving said output signal of said omnidirectional antenna and providing a filtered output thereof;

d) a wide band receiver receiving said output of said notch filter and providing first and second outputs each representative of said output of said notch filter;

e) an oscillator having a predetermined frequency and providing an output signal;

f) a second mixer having first and second inputs and an output and with the first input receiving the first output of said wide band receiver and the second input receiving the output of said oscillator, said output of said second mixer connected to said second input of each of said first mixers;

g) a digitizer/angle encoder connected to receive each of the output signals of each of the channels of said log video amplifier receiver, said digitizer/angle encoder providing output quantities representative of the amplitude, pulse width and time of arrival (TOA) of said RF signal and direction finding (D/F) data; and h) a system digital processor connected to receive said output quantities of said digitizer/angle encoder and said second output of said wide band receiver.

2. The ESM system according to claim 1, wherein each channel of said log video amplifier further comprises;

a) a band filter having an input connected to said respective output signal of said CBL antenna and providing a representative output thereof;

b) a RF limiter connected to receive said output of said band filter and providing a representative output thereof; and c) an amplifier connected to receive said output of said RF limiter and providing a representative output thereof and connected to said first input of said first mixer.

3. The system according to claim 1, wherein said incoming RF signals have a known frequency spectrum, and wherein said notch filter is a YlG tuned notch filter that provides a tunable band rejection with a notch depth greater than 50 dB over a 30 MHz bandwidth and wherein said predetermined frequency of said oscillator is about 160 MHz so that said output of said second mixer provides RF signals whose frequency spectrum is offset by about 160 MHz relative to said known frequency spectrum of said incoming RF signals.

4. The system according to claim 3, wherein said notch filter is a set of fixed and tunable YlG filters.

5. An electronic support measure (ESM) system providing interference suppression and having a constant beamwidth lens (CBL) antenna receiving incoming RF signals and providing a plurality of output signals, said ESM system comprising:

a) a log video amplifier receiver having multiple channels with each channel receiving a respective one of said plurality of output signals of said CBL antenna each channel of, said log video amplifier comprising a first mixer having first and second inputs and an output and with the first input receiving a signal representative of said respectively output signal of said CBL antenna, said output of said first mixer connected to a logarithmic amplifier which provides an output signal comprising the output signal of the respective channel of said log video amplifier receiver;

b) an omnidirectional antenna receiving said incoming RF signals and providing a representative output thereof;

c) a notch filter receiving said output signal of said omnidirectional antenna and providing a filtered output thereof;

d) a wide band receiver receiving said output of said notch filter and providing first and second outputs each representative of said output of said notch filter;

e) an oscillator having a predetermined frequency and providing an output signal;

f) an electronic switch having first and second inputs and an output with the first input connected to said output signal of said oscillator and with the second input connected to a control signal, said electronic switch providing said output signal of said oscillator at its output in the presence of both of said output signal of said oscillator and said control signal;

g) a second mixer having first and second inputs and an output and with the first input receiving the first output of said wide band receiver and the second input receiving the output of said oscillator by way of said electronic switch, said output of said second mixer connected to said second input of said first mixers;

h) a digitizer/angle encoder connected to receive each of the output signals of each of the channels of said log video amplifier receiver, said digitizer/angle encoder providing output quantities representative of the amplitude, pulse width and time of arrival (TOA) of said RF signal and direction finding (D/F) data; and i) a system digital processor connected to receive said output quantities of said digitizer/angle encoder and said second output of said wide band receiver and generating said control signal.

6. The ESM system according to claim 5, wherein each channel of said log video amplifier further comprises:

a) a band filter having an input connected to said respective output signal of said CBL antenna and providing a representative output thereof;

b) a RF limiter connected to receive said output of said band filter and providing a representative output thereof; and c) an amplifier connected to receive said output of said RF limiter and providing a representative output thereof and connected to said first input of said first mixer.

7. The system according to claim 5, wherein said incoming RF signals have a known frequency spectrum, and wherein said notch filter is a YlG tuned notch filter that provides a tunable band rejection with a notch depth greater than 50 dB over a 30 MHz bandwidth and wherein said predetermined frequency of said oscillator is about 160 MHz so that said output of said second mixer provides RF signals whose frequency spectrum is offset by about 160 MHz relative to said known frequency spectrum of said incoming RF signals.

8. The system according to claim 7, wherein said notch filter is a set of fixed and tunable YlG filters.

9. An electronic support measure (ESM) system providing interference suppression and having a constant beamwidth lens (CBL) antenna receiving incoming RF signals and providing a plurality of output signals, said ESM system comprising:

a) a log video amplifier receiver having multiple channels with each channel receiving a respective one of said plurality of output signals of said CBL antenna each channel of, said log video amplifier comprising a first mixer having first and second inputs and an output and with the first input receiving a signal representative of said respectively output signal of said CBL antenna, said output of said first mixer connected to a logarithmic amplifier which provides an output signal comprising the output signal of the respective channel of said log video amplifier receiver;

b) an omnidirectional antenna receiving said incoming RF signals and providing a representative output thereof;

c) a notch filter receiving said output signal of said omnidirectional antenna and providing a filtered output thereof;

d) a wide band receiver receiving said output of said notch filter and providing first an output representative of said output of said notch filter;

e) a signal source having a predetermined frequency responsive to a control signal and providing an output signal in response thereto, said output signal being connected to each of the second inputs of said first mixer to produce a parallel array of log video amplifier receivers serving as superheterodyne receivers;

f) a digitizer/angle encoder connected to receive each of the output signals of each of the channels of said log video amplifier receiver, said digitizer/angle encoder providing output quantities representative of the amplitude, pulse width and time of arrival (TOA) of said RF signal and direction finding (D/F) data; and g) a system digital processor connected to receive said output quantities of said digitizer/angle encoder and said output of said wide band receiver, said system digital processor generating said control signal.

10. The ESM system according to claim 9, wherein each channel of said log video amplifier further comprises;

a) a band filter having an input connected to said respective output signal of said CBL antenna and providing a representative output thereof;

b) a RF limiter connected to receive said output of said band filter and providing a representative output thereof; and c) an amplifier connected to receive said output of said RF limiter and providing a representative output thereof connected to said first input of said first mixer.

11. The system according to claim 9, wherein said incoming RF signals have a known frequency spectrum, and wherein said notch filter is a YlG tuned notch filter that provides a tunable band rejection with a notch depth greater than 50 dB over a 30 MHz bandwidth.

12. The system according to claim 11, wherein said notch filter is a set of fixed and tunable YlG filters.

13. An electronic support measure (ESM) system providing interference suppression and having a constant beamwidth lens (CBL) antenna receiving incoming RF signals and providing a plurality of output signals, said ESM system comprising:

a) a digitizer and processor having multiple channels with each channel receiving a respective one of said plurality of output signals of said CBL antenna, said digitizer and processor receiving a synthesized signal, said digitizer and processor providing a logarithmic output representative of said incoming RF signals and comprising the output signal of the respective channel of said digitizer and processor;

b) an omnidirectional antenna receiving said incoming RF signals and providing a respective output thereof;

c) a notch filter receiving said output signal of said omnidirectional antenna and providing a filtered output thereof;

d) a wide band receiver receiving said output of said notch filter and providing first and second outputs each representative of said output of said notch filter;

e) an oscillator having a predetermined frequency and providing an output signal;

f) a first mixer having first and second inputs and an output and with the first input receiving the first output of said wide band receiver and the second input receiving the output of said oscillator, said output of said first mixer serving as said synthesized signal and connected to said digitizer and processor;

g) a digitizer/angle encoder connected to receive each of the output signals of each of the channels of said digitizer and processor, said digitizer/angle encoder providing output quantities representative of the amplitude, pulse width and time of arrival (TOA) of said RF signal and direction finding (D/F) data; and h) a system digital processor connected to receive said output quantities of said digitizer/angle encoder and said second output of said wide band receiver.

14. The system according to claim 13, wherein said incoming RF signals have a known frequency spectrum, and wherein said notch filter is a YlG tuned notch filter that provides a tunable band rejection with a notch depth greater than 50 dB over a 30 MHz bandwidth and wherein said predetermined frequency of said oscillator is about 160 MHz so that said output of said second mixer provides RF signals whose frequency spectrum is offset by about 160 MHz relative to said known frequency spectrum of said incoming RF signals.

15. The system according to claim 14, wherein said notch filter is a set of fixed and tunable YlG filters.

16. A method of removing interference signals from an electronic support measure (ESM) system receiving incoming RF signals having a frequency spectrum, said ESM system having first and second antenna subsystems with the first subsystem providing a plurality of parallel outputs each with signals thereat and each representative of the incoming RF signals and with the second subsystem providing a single serial output representative of the incoming RF signals; said method comprising the steps of;

a) providing elements for receiving and processing each of said RF signals at each of said parallel outputs, said elements including a first mixer for each of said parallel outputs and having first and second inputs and an output, with the first input connected to signals representative of said RF signals received from said parallel outputs;

b) Providing elements for receiving and processing said RF signals from said serial output, said elements including;

b1) a notch filter for receiving said RF signals from said serial output and providing an output;

b2) a receiver for receiving said output of said notch filter and providing an output;

b3) a signal source providing an output signal having a known frequency; and b4) a second mixer having first and second inputs and an output with the first input connected to said output of said receiver and with the second input connected to said signal source, said output of said second mixer being connected to said second inputs of said first mixers.

17. The method according to claim 16, wherein said notch filter is a YlG tuned notch filter that provides a tunable band rejection with a notch depth greater than 50 dB over a 30 MHz bandwidth and wherein said signal source is an oscillator and wherein said predetermined frequency RF is about 160 MHz so that said output of said second mixer provides RF signals whose frequency spectrum is offset by about 160 MHz relative to said known frequency spectrum of said incoming RF signals.

18. The method according to claim 17, wherein said notch filter is a set of fixed and tunable YlG filters.

19. The method according to claim 16, wherein said notch filter is a YlG tuned notch filter that provides a tunable band rejection with a notch depth greater than 50 dB over a 30 MHz bandwidth and wherein said signal source provides a synthesized signal so that said output of said second mixer provides said synthesized signal so as to conform to the processing of RF signals at said parallel outputs to act as a parallel array of superheterodyne receivers.

20. The method according to claim 16, wherein said ESM system has knowledge of the active condition of CW emitters and said method further comprises inhibiting said output of said signal source during said active condition of said CW emitters.

* * * * *